United States Patent [19]

Mo

[11] Patent Number: 5,719,481

[45] Date of Patent: Feb. 17, 1998

[54] METHODS AND APPARATUS FOR ATTENUATING THE VIBRATION OF A ROBOT ELEMENT

[75] Inventor: Jin-Yong Mo, Seoul, Rep. of Korea

[73] Assignee: Samsung Electronics Co., Ltd., Suwon, Rep. of Korea

[21] Appl. No.: 497,048

[22] Filed: Jun. 30, 1995

[30] Foreign Application Priority Data

Jun. 30, 1994 [KR] Rep. of Korea ......... U.M.94-16161 U

[51] Int. Cl.$^6$ ..................................... G05B 5/01
[52] U.S. Cl. ..................... 318/611; 318/623; 318/644; 188/222.5; 361/226
[58] Field of Search ..................... 318/611, 625, 318/623, 568.12, 568.18, 644, 642; 384/99; 137/909; 188/222.5, 106 F; 361/226, 228

[56] References Cited

U.S. PATENT DOCUMENTS

| | | | |
|---|---|---|---|
| 4,071,252 | 1/1978 | Gillespie | 137/909 X |
| 5,000,299 | 3/1991 | Goto et al. | 188/106 F X |
| 5,354,489 | 10/1994 | Inoue et al. | 188/222.5 X |
| 5,417,314 | 5/1995 | Sproston et al. | 188/222.5 X |
| 5,462,361 | 10/1995 | Sato et al. | 384/99 X |
| 5,496,483 | 3/1996 | Herrmann et al. | 188/222.5 X |

*Primary Examiner*—Karen Masih
*Attorney, Agent, or Firm*—Burns, Doane, Swecker & Mathis, L.L.P.

[57] ABSTRACT

A robot comprises a member traveling along a threaded rotary shaft which decelerates when the member approaches a predetermined location on the shaft. Rotation of the rotary shaft is subjected to a resistance imposed by a fluid whose viscosity is increasable by the application of an electrical charge to the fluid. The point at which the rotary shaft begins to decelerate is sensed, and an electrical charge is applied to the fluid to increase its viscosity and attenuate vibration of the member.

5 Claims, 5 Drawing Sheets

5,719,481

METHODS AND APPARATUS FOR ATTENUATING THE VIBRATION OF A ROBOT ELEMENT

BACKGROUND OF THE INVENTION

1. Field of the Invention

The present invention relates to an industrial robot for use in effecting the insertion and/or assembly of electronic parts, and more particularly to a vibroisolating apparatus of a robot by which vibrations generated during the operation and stoppage of the robot can be attenuated to a minimum by a fluid resistance.

2. Description of the Prior Art

Generally, an industrial robot is utilized during electrical and electromechanical fields, and particularly a cartesian-coordinate robot is widely used for insertion and/or assembly of electronic parts and the like because the same is simple in construction, light in weight and can maintain a sophisticated precision.

In a typical cartesian-coordinate robot, a pair of Y axis tables 1 disposed at a predetermined interval are each provided with a ball thread shaft 3 rotating according to the operation of a driving means 2, which may comprise a motor, arranged at one side of the X axis table, as illustrated in FIG. 1, and each ball thread shaft 3 is connected to a ball nut 4 for enabling movement thereof. The ball nut 4 is fixedly connected with a bracket 5 which supports an X axis table 6 so that the same can freely travel on the ball thread shafts 3 along the Y axis.

Furthermore, the X axis table 6 is connected with a ball thread shaft 3a which rotates according to the operation of a drive mechanism which includes a head driving means 7, which may comprise a motor, disposed at one end thereof, and the ball thread shaft 3a is connected to a head 8 for producing travel of the head in the X axis direction. The head 8 is equipped with a nozzle 8a at a lower side thereof in order to insert or assemble parts or the like (not shown) at a predetermined position.

Meanwhile, each ball thread shaft 3, as illustrated in FIG. 2, is supported by a bearing member 9a disposed within a housing 9 fixedly arranged on the Y axis table 1.

Accordingly, the head 8 provided with electronic parts or the like at a tip end of the nozzle 8a at a predetermined position thereon is transported in the X axis direction by a predetermined distance by the ball thread shaft 3a rotating according to the operation of the head driving means 7, and is transported in the Y axis direction by a predetermined distance by the ball thread shaft 3 rotating according to the operation of the driving means 2 and is stopped by control means (not shown) at an appropriate position according to a pre-input program.

At this time, the nozzle 8a arranged at the head 8 is lowered to thereby insert and/or assemble the parts at an appropriate position.

After the insertion and/or assembly of the parts is completed, the head 8 and the X axis table 6 are returned to the original position.

The ball thread shafts 3 and 3a perform forward rotation when parts are assembled, and perform reverse rotation when the X axis table is returned.

However, performance of the robot thus constructed is determined by how fast and accurately the parts are inserted and/or assembled after the parts are received.

Generally, when the X axis table 6 travels along the Y axis, it is accelerated for a period 0-to from an initial rest position, as illustrated in FIG. 3, and performs a uniform speed for a period of T0-T1 and performs a deceleration for a period of T1-T2 and finally stops.

At this time, it is inevitable that the robot should generate vibration resulting from a sudden deceleration.

In the conventional robot, there is a problem in that the vibration generated from stoppage of the X axis table depends on the rigidity of the bearing member supporting the ball thread shaft, and much time (t) is consumed to achieve an appropriate vibration displacement amplitude (d) (see FIG. 4) for accurately inserting and/or assembling the parts, thereby reducing productivity and increasing manufacturing cost.

SUMMARY OF THE INVENTION

The present invention solves the aforementioned problems in the prior art, and it is an object of the present invention to provide a vibroisolating apparatus of a robot by which vibration resulting from stoppage of the robot can be attenuated to a minimum and at the same time, stoppage time can be markedly reduced to thereby increase productivity and reduce a manufacturing cost remarkably.

In accordance with the object of the present invention, there is provided a vibroisolating apparatus of a robot employing an X axis table travelling in a Y axis direction on a Y axis table according to operation of driving means, and a head travelling in an X axis direction on the X axis table, the vibration attenuating apparatus disposed on the Y axis table for attenuating by way of fluid resistance the vibration generated during stoppage of the X axis table.

Accordingly, the vibration attenuating means of simple construction can attenuate to minimum the vibration generating in the course of stoppage of the X axis table, to remarkably reduce the time consumed in the part insertion and assembly processes, to improve the productivity, and at the same time, to decrease the manufacturing cost.

BRIEF DESCRIPTION OF THE DRAWINGS

Other objects and aspects of the invention will become apparent from the following description of embodiments with reference to the accompanying drawings in which.

DETAILED DESCRIPTION OF A PREFERRED EMBODIMENT OF THE INVENTION

Figure 1:
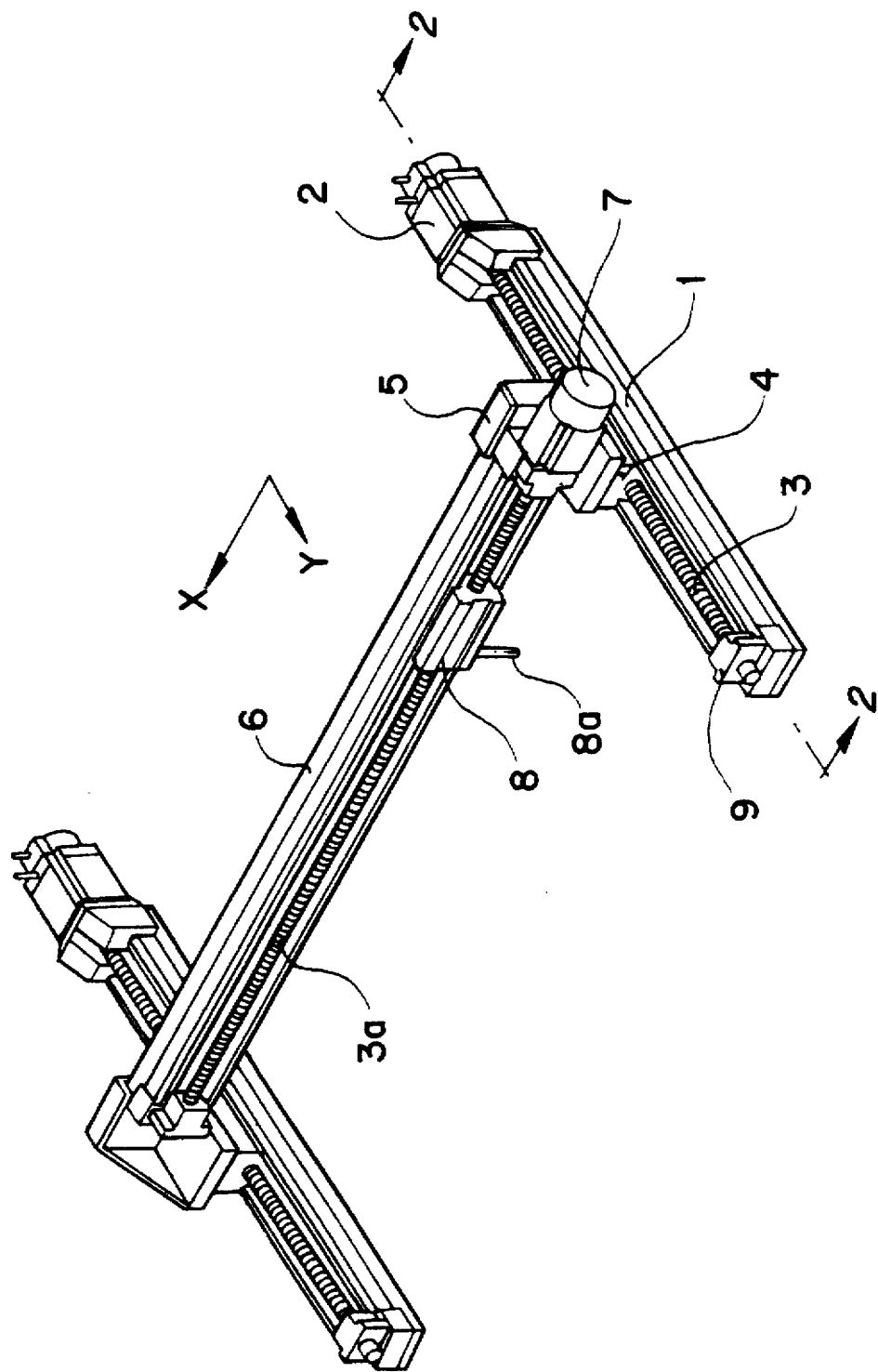
FIG. 1 is a perspective view illustrating a conventional cartesian-coordinate robot.
Figure 2:
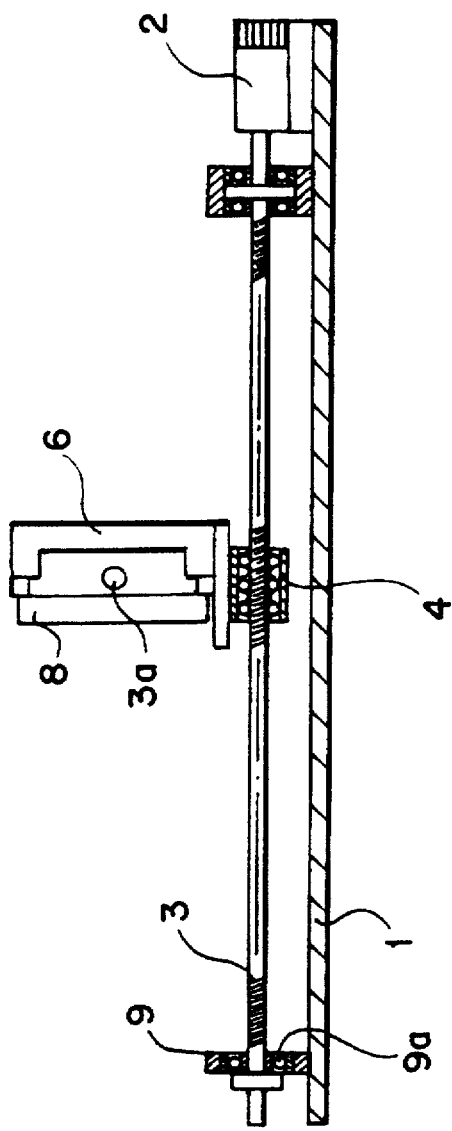
FIG. 2 is a longitudinal sectional view along 2—2 line in FIG. 1.
Figure 3:
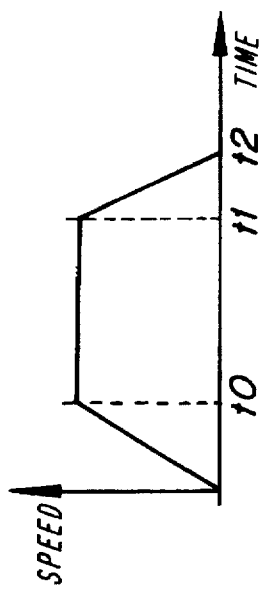
FIG. 3 is a graph illustrating a speed change according to a period from operation to stoppage of the robot.
Figure 4:
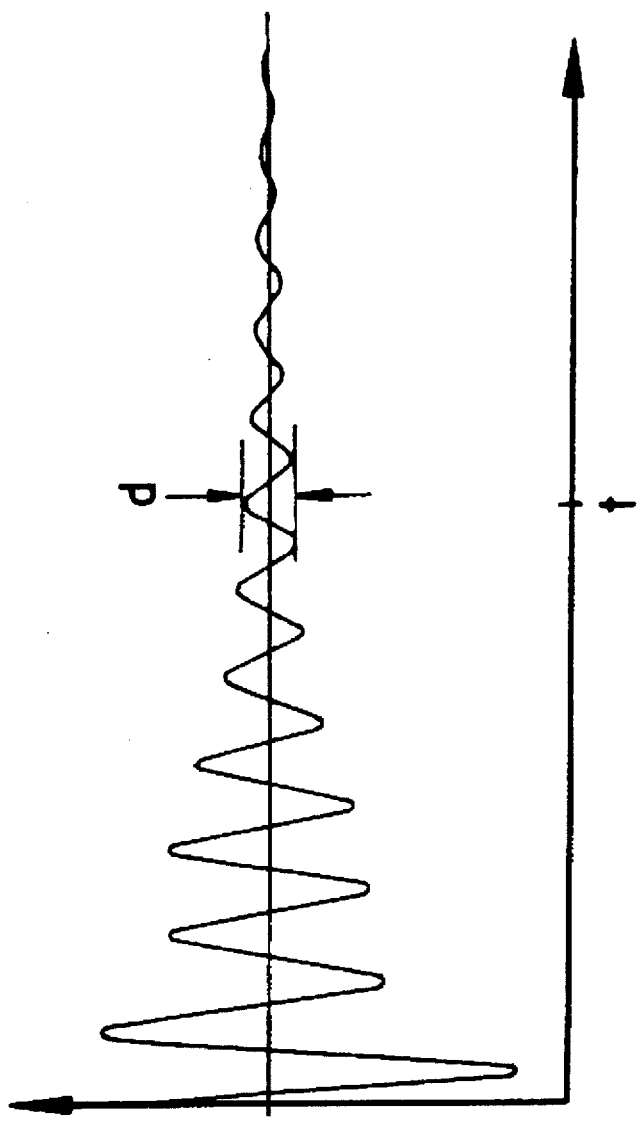
FIG. 4 is a graph illustrating a vibration amplitude of the X axis table during stoppage of the conventional robot.
Figure 5:
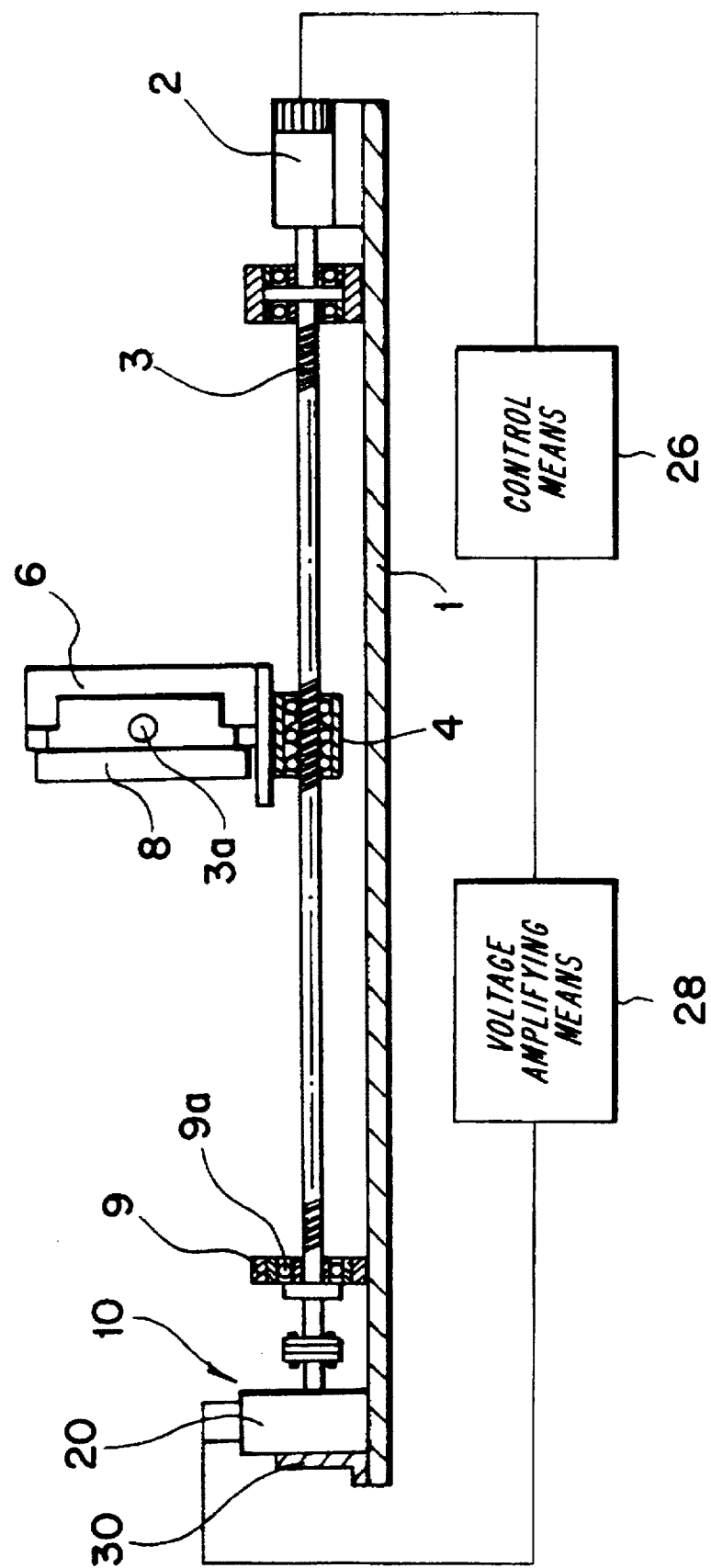
FIG. 5 is a lateral sectional drawing illustrating a vibroisolating apparatus of a robot according to the present invention.

The embodiment of the present invention will be described in detail with reference to FIGS. 5, 6 and 7.

Throughout the drawings, like reference numerals and symbols are used for designation of like or equivalent parts or portions, and descriptions therefor are omitted, for simplicity of illustration and explanation.

Reference numeral 10 indicates a vibration attenuating apparatus or means for shortening a stopping time of the X axis table, the attenuating means 10 being arranged at one side of the Y axis table 1 to thereby attenuate by way of fluid resistance the vibration generated from the ball thread shaft 3 during stoppage of the X axis table 6.

Figure 6:
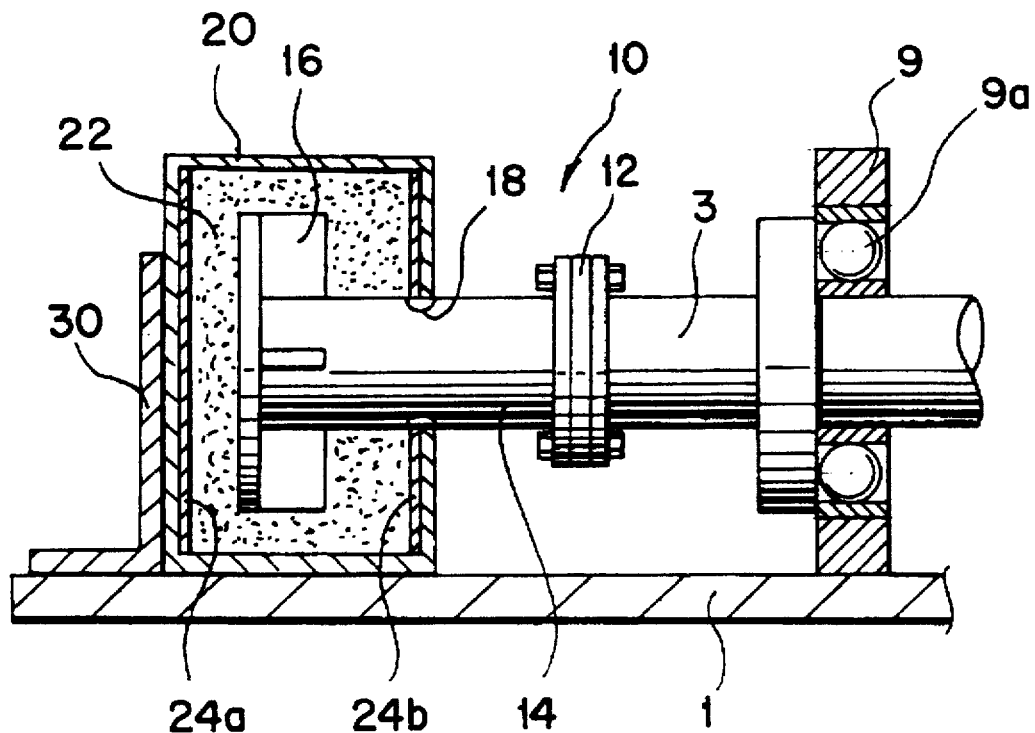
FIG. 6 is an enlarged sectional view illustrating principal parts of the vibroisolating apparatus of FIG. 5.
Figure 7:
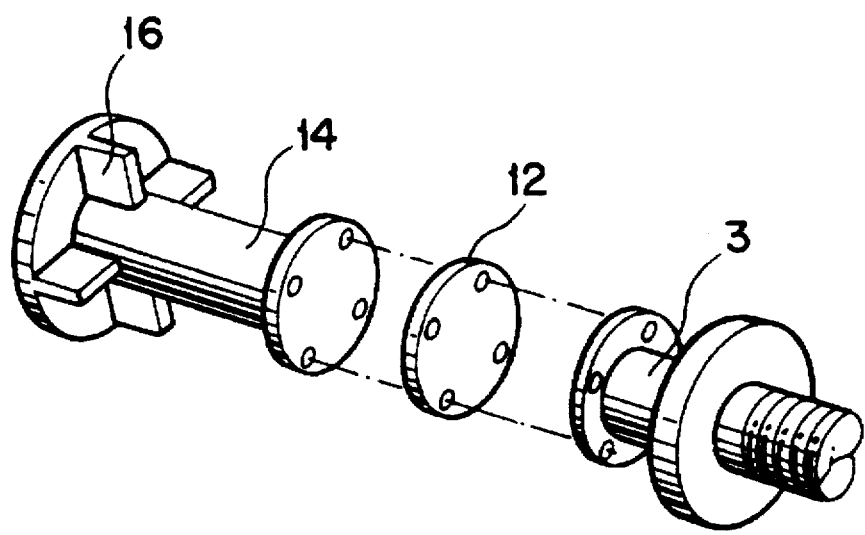
FIG. 7 is a partially exploded perspective view illustrating the principal parts depicted in FIG. 6.

The vibration attenuating means 10, as illustrated in FIGS. 6 and 7, is provided with a connecting axis 14 fixedly fastened at one end thereof to the ball thread shaft 3 (e.g., by bolts), with an electrical insulating member 12 disposed therebetween. The connecting axis 14 is provided at its other end with a plurality of resistance vanes 16.

Furthermore, the resistance vanes 16 are disposed inside of a case member 20 with a sealing member 18 formed between the case 20 and the connecting axis 14. The case member 20 is filled at an inner side thereof with an electrically viscous fluid 22, i.e., a fluid whose viscosity and rigidity increase as voltage is applied.

Furthermore, inner sides of the case member 20 are provided with a pair of electrode plates 24a and 24b spaced by a predetermined distance. The electrode plates 24a and 24b are connected with voltage amplifying means 28 for amplifying a voltage sent by control means 26, which together are part of a voltage applying circuit.

A fixing bracket 30 fixes the case member 20 on the Y axis table.

Next, the operation and effect of the vibroisclating apparatus of the robot thus constructed according to the present invention will be described.

First of all, the head 8 having the nozzle 8a carrying assembly parts travels a predetermined distance in the X axis direction by the ball thread shaft 3a rotating in response to the operation of the head driving means 7 and along the Y axis by the operation of the driving means 2 and is then stopped to thereby insert and/or assemble parts at the predetermined position.

A point when the driving means 2 starts to decelerate is detected by the control means 26 and is sent to the voltage amplifying means 28.

The voltage amplified by the voltage amplifying means 28 is applied to the vibration attenuating means 10 to thereby attenuate the vibration generated in the course of deceleration and stoppage of the ball thread shaft 3 and the X axis table 6.

In other words, as the electrode plates 24a and 24b within the case member 20 are applied with voltage, electrically chargeable fluid particles in the electrically viscous fluid 22 are charged to thereby increase their sticking or bonding strength to increase fluid viscosity.

Accordingly, the resistance vanes 16 rotating in the electrically viscous fluid 22 where viscosity and rigidity have been increased by the charging of the fluid particles encounter strong fluid resistance from the electrically viscous fluid 22, thereby shortening the stoppage time of the ball thread shaft 3 markedly, and at the same time, minimizing any residual vibration of the X axis table 6 resulting from deceleration-induced vibration of the ball thread shaft 3 generating during the stoppage thereof.

Furthermore, the electrically viscous fluid 22 in the case member 20 is completely sealed by the sealing member 18, thereby preventing the electrically viscous fluid 22 from leaking out of the case member 20.

Still furthermore, the connecting axis 14 and the ball thread shaft 3 are fixedly fastened by fastening means such as bolt or the like with the electrical isolating member 12 disposed therebetween, to thereby to prevent electrical leak and thereby insure safety.

According to the embodiment of the present invention, although the vibration attenuating means 10 is disposed at one end of the ball thread shaft which displaces the X axis table 6 to attenuate vibration generated during stoppage of the X axis table 6, it should be noted that the embodiment is not intended to limit the scope of the invention.

By way of example, it should be apparent that the vibration attenuating means 10 can be also disposed on the ball thread axis 3a, to thereby attenuate the vibration generating in stoppage of the head 8.

As is apparent from the foregoing, according to the vibroisolating apparatus of the present invention, the vibration attenuating means of simple construction can attenuate the vibration generating during the stoppage of the ball thread shafts and the X and Y axis tables by way of a resistance fluid, markedly reducing the time for insertion and/or assembly of parts, improving productivity, and at the same time, decreasing the manufacturing cost as well.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A robot comprising a table;

an element movable along said table;

a drive mechanism for moving said element along said table, whereupon vibration is produced;

a vibration attenuation apparatus operably connected to said drive mechanism for attenuating the vibration, the vibration attenuation apparatus including a fluid engaging a portion of said drive mechanism and a case containing said fluid, said fluid being an electrically responsive fluid the viscosity of which is increased by application of a voltage thereto;

a voltage-applying circuit connected to said fluid;

wherein said portion of said drive mechanism comprises a rotary shaft, said vibration attenuation apparatus comprising a vane connected to said rotary shaft for rotation therewith, said vane disposed in said case so that said fluid resists rotation of said vane; and a pair of electrode plates disposed in said case for charging said fluid, said plates comprising parts of said voltage-applying circuit.

2. The robot according to claim 1, further including an electrical insulator disposed between said vanes and said rotary shaft.

3. The robot according to claim 7, wherein said case is sealed against leakage of said fluid.

4. A robot comprising:

a first rotary shaft oriented in a first direction;

a second rotary shaft mounted on said first rotary shaft and oriented in a second direction;

a first drive motor for rotating said first rotary shaft to move said second rotary shaft along said first rotary shaft in said first direction;

a head mounted on said second rotary shaft for movement therealong in said second direction;

a second drive motor for rotating said second rotary shaft to move said head along said second rotary shaft in said second direction; and a vibration attenuating mechanism operably connected to said first rotary shaft and including an electrically-responsive viscous fluid whose viscosity is increased by the application of a voltage thereto for resisting rotation of said first rotary shaft.

5. The robot according to claim 4, wherein said vibration attenuating mechanism further includes a voltage-applying circuit connected to said fluid.

* * * * *